United States Patent [19]
Boyce et al.

[11] Patent Number: 5,923,121
[45] Date of Patent: Jul. 13, 1999

[54] FLUORESCENT LAMP HAVING AN ATTACHMENT THEREIN FOR REDUCTION OF SOLUBLE MERCURY IN THE LAMP AND TO ACT AS A FAIL-SAFE AT THE END OF LAMP LIFE

[75] Inventors: Craig S. Boyce; Tyra N. Evans, both of Woodford, Ky.; Dennis B. Shinn, Topsfield; Michael D. Sweetland, Groveland, both of Mass.; Billy W. Tuttle, Londonderry, N.H.

[73] Assignee: Osram Sylvania Inc., Danvers, Mass.

[21] Appl. No.: 08/950,242

[22] Filed: Oct. 14, 1997

[51] Int. Cl.⁶ .............................. H01J 17/34; H01J 17/24
[52] U.S. Cl. .................... 313/559; 313/318.02; 313/558; 313/574
[58] Field of Search .................. 313/318.01, 318.02, 313/483, 490, 491, 545, 558, 552, 574, 575, 627, 559; 439/611, 612

[56] References Cited

U.S. PATENT DOCUMENTS

| | | | |
|---|---|---|---|
| 3,265,917 | 8/1966 | Ray | 313/109 |
| 3,534,212 | 10/1970 | Evans | 313/174 |
| 3,562,571 | 2/1971 | Evans | 313/109 |
| 4,105,910 | 8/1978 | Evans | 313/490 |
| 4,268,306 | 5/1981 | Bjorkman | 75/81 |
| 4,435,284 | 3/1984 | Heytmeijer | 209/3 |
| 4,715,838 | 12/1987 | Kulander | 445/61 |
| 5,229,686 | 7/1993 | Fowler et al. | 313/565 |
| 5,229,687 | 7/1993 | Fowler et al. | 313/565 |
| 5,374,871 | 12/1994 | Johnson | 313/546 |
| 5,736,813 | 4/1998 | Foust et al. | 313/490 |
| 5,777,434 | 7/1998 | Dietrich et al. | 313/490 |

FOREIGN PATENT DOCUMENTS 50-78683  5/1985  Japan.

OTHER PUBLICATIONS

*Federal Register*, pp. 26987–26998, vol. 55, No. 126, Jun. 29, 1990.

Primary Examiner—Nimeshkumar D. Patel
Attorney, Agent, or Firm—Carlo S. Bessone

[57] ABSTRACT

A fluorescent lamp having an attachment mounted therein for reduction of soluble mercury contained in the lamp, and to act as a fail-safe at the end of lamp life, comprises a collar of iron mesh providing an iron surface area sufficiently large to reduce a portion of the soluble mercury to elemental mercury when the lamp is pulverized to granules and subjected to a suitable aqueous acid solution, such that a remaining portion of soluble mercury leachable is less than 0.2 milligram per liter of the aqueous acid solution, whereby to provide a substantially non-soluble mercury leachable lamp. The attachment is adapted for disposition around an electrode mount in the lamp and is electrically isolated from lead-in contacts in the mount, such that upon exhaustion of a cathode coating in the lamp, an electrical arc stream impinges on the attachment, causing the mount within the attachment to crack, whereby to provide for safe termination of operation of the lamp.

20 Claims, 3 Drawing Sheets

FLUORESCENT LAMP HAVING AN ATTACHMENT THEREIN FOR REDUCTION OF SOLUBLE MERCURY IN THE LAMP AND TO ACT AS A FAIL-SAFE AT THE END OF LAMP LIFE

BACKGROUND OF THE INVENTION

1. Field of the Invention

This invention relates in general to mercury vapor discharge lamps and pertains, more particularly, to a fluorescent lamp which contains an agent for substantially reducing the amount of soluble mercury measurable after pulverization of the lamp, and which acts as a fail-safe at the end of lamp life.

2. Description of the Prior Art

Fluorescent lamps are well known in the art and are characterized as mercury vapor discharge lamps which include a pair of electrodes sealed in an elongated envelope whose interior surface is coated with phosphor. The envelope contains a quantity of mercury and a rare gas at a reduced pressure, for example, in the order of 1–5 torr.

During lamp manufacture, about 10–40 milligrams of elemental mercury is sealed in each fluorescent lamp. It is known that most of the mercury adheres to the phosphor coating with only a very small portion of the mercury being in the form of mercury vapor. After alkaline earth metal oxides coating the lamp electrodes are volatized, the oxides decompose in the discharge space and freed oxygen converts some of the elemental mercury to a salt or compound, such as mercuric oxide (HgO) which is highly soluble.

There is concern that a waste stream resulting from the disposal of fluorescent lamps may leach excessive amounts of the soluble form of mercury. One method of measuring the amount of soluble mercury which may leach from the waste stream resulting from the disposal of fluorescent lamps is described in the Toxicity Characteristic Leaching Procedure (TCLP) prescribed on pages 26987–26998 of volume 55, number 126 of the Jun. 29, 1990 issue of the Federal Register. According to the procedure, the lamp being tested is pulverized into granules having a surface area per gram of material equal to or greater than 3.1 $cm^2$ or having a particle size smaller than 1 cm in its narrowest dimension. Following pulverization, the granules are subjected to an extract fluid comprising a sodium acetate buffer solution having a pH of approximately 4.93 and having a weight twenty times the weight of the granules.

The Environmental Protection Agency (EPA) defines a maximum concentration level for mercury at 0.2 milligram leachable mercury per liter of extract fluid when the TCLP is applied. According to present standards, a fluorescent lamp is considered "non-leachable" when less than 0.2 milligram of leachable mercury per liter of extract fluid results from a TCLP extraction.

Various methods have been proposed which attempt to treat or process burned-out discharge lamps, or scrap lamp exhaust tubing containing mercury, in order to reclaim the mercury and thereby reduce the amount of mercury-contaminated scrap glass. For example, U.S. Pat. No. 4,268,306 (Bjorkman) discloses a treatment whereby the expended or scrapped lamps are crushed into fragments which are then placed in a treatment vessel in which the mercury is recovered by distillation processes. This treatment is carried out batchwise in a sealed container into which nitrogen is introduced. The container is heated and placed under vacuum to vaporize the mercury. The vaporized mercury is then removed from the container and condensed in a cooling trap. Following the process, the treated lamp fragments, i.e., glass and phosphor, may be dumped without concern about mercury leaching.

U.S. Pat. No. 4,715,838 (Kulander) teaches a method and apparatus for recovering the luminescent material from mercury vapor electric discharge lamps, whereby the amount of lamp waste requiring treatment in a distillation chamber can be reduced, thereby increasing the capacity of the chamber with respect to the number of lamps. After the ends of the lamp bulb or tube are separated from the intermediate bulb part, the luminescent material is loosened from the inner wall surface of the bulb part with the aid of a stripping device which is arranged to be inserted into the bulb part from one end thereof. The loosened material is collected with the aid of a suction device connected to the other end of the bulb part and, thereafter, may be introduced into the distillation chamber, thereby obviating the need to fill the chamber with the residual "clean" glass bulb.

Japanese Patent Application No. 58-184558 (Kitsugi et al.) teaches a method for solidifying discarded fluorescent lamps and insolubilizing the mercury contained therein. The method involves adding sulfur to crushed fluorescent lamp waste. The result is pulverized an amount of time sufficient to produce granules with sizes 5 millimeters or less. Cement and water are added and the result is kneaded. The kneaded material prepared in this way is put into molds to form a stabilized solidified material having a mercury concentration of less than 0.005 milligram per liter water.

U.S. Pat. No. 4,435,284 (Heytmeijer) teaches a process for removing residual mercury from scrap fluorescent lamp exhaust tubulation, or similar scrap glass. A very small predetermined amount of finely divided silica or alumina powder is added to the mercury contaminated scrap glass and the mixture is agitated for a short predetermined time during which the mercury is stripped from the tubulation. The separated mercury, powder and glass mixture is then decanted through a screen of suitable mesh to remove the separated mercury and powder from the glass. The mercury is then rinsed with a suitable solvent to remove the oxide powder from the mercury.

U.S. Pat. Nos. 5,229,686 (Fowler et al.) and 5,229,687 (Fowler et al.) relate to a mercury discharge lamp which can be disposed of without prior expensive treatment to reclaim mercury. Such is accomplished by the provision of a mercury vapor discharge lamp having an envelope of light-transmitting vitreous material containing an inert starting gas and a quantity of elemental mercury at least partially convertible to soluble mercury. In the '686 patent, an effective amount of a chemical agent suitable for chemically converting a substantial portion of the soluble mercury to a sparingly soluble salt when the lamp is pulverized to granules and subjected to a suitable aqueous acid solution is located within the lamp. Preferably, the sparingly soluble salt is soluble to less than 0.2 milligram per liter mercury. In a preferred embodiment, the chemical agent comprises approximately 3.45 grams of potassium periodate. The lamp further includes a sealed enclosure (e.g., glass) for containing the chemical agent. The sealed enclosure is disposed within the lamp envelope or external to the envelope, such as within a cavity defined by a lamp base member. The sealed enclosure is rupturable upon pulverization of the lamp. In an alternative embodiment, the chemical agent is mixed with the basing cement used to secure one or more of the lamp bases to the lamp envelope.

In the '687 patent, first and second electrodes are located within the lamp envelope for establishing an arc discharge therebetween. An effective amount of a chemical agent suitable for electrochemically reducing a substantial portion of the soluble mercury to elemental mercury when the lamp is pulverized to granules and subjected to a suitable aqueous acid solution is located within the lamp and effectively remote from the arc discharge. The chemical agent is an element having an electrode potential for oxidation reactions higher than mercury but not sufficiently active to displace hydrogen from the aqueous acid solution. In one embodiment, the chemical agent comprises approximately 0.5 to 5 grams of copper powder or copper dust. In another embodiment, the chemical agent comprises approximately 0.25 gram to 5 grams of iron powder. The lamp further includes a sealed enclosure (e.g., glass) for containing the chemical agent:. The sealed enclosure is disposed within the lamp envelope or external to the envelope, such as within a cavity defined by a lamp base member. The sealed enclosure is rupturable upon pulverization of the lamp. In an alternative embodiment, the chemical agent is mixed with the basing cement used to secure one or more of the lamp bases to the lamp envelope.

Another problem encountered in fluorescent lamps, particularly those designed for operation at high power loadings, is that the lamps sometimes do not fail in a safe manner at the end of their useful lives. This occurs when the emission material on the electrodes becomes exhausted and the arc strikes the lead wires and causes them to melt or soften sufficiently that they contact the glass bulb and cause it to crack. As a safeguard against this potential hazard, the lamps are provided with an internal "fail-safe" structure that provides an electrically-conductive path from one or both lead wires to a portion of the glass mount. At the end of the useful life of the lamp, the arc discharge is accordingly directed, or drawn, by the fail-safe conductor means to the mount, thus cracking and puncturing the mount and rendering the lamp inoperative.

A fluorescent lamp wherein the fail-safe component comprises a wire or a coating of conductive material that is applied to the mount press and connected to one of the leads is disclosed in U.S. Pat. No. 3,265,917 issued Aug. 9, 1966 to J. G. Ray. A fluorescent lamp wherein the fail-safe conductive component comprises a strip of aluminum powder that is coated onto the mount press and contacts one of the lead wires is disclosed in Japanese Patent Publication No. 44-15840 dated Jul. 14, 1969 of Sometani et al (applied for on May 12, 1965 by Toshiba Electric Company).

An amalgam-type fluorescent lamp wherein the dual functions of fast "warm-up" and fail-safe operation are achieved by means of a notched yoke of wire mesh or sheet metal that is "clipped" onto the mount press and carries an auxiliary source of amalgam is described in U.S. Pat. No. 3,562,571 issued Feb. 9, 1971 to George S. Evans et al.

In U.S. Pat. No. 4,105,910 issued Aug. 8, 1978, to George S. Evans, safe failure of a fluorescent lamp at the end of its useful life is achieved by coating selected portions of both mounts with a material that contains indium, or an indium alloy, and initially is semiconductive. The coating is applied to portions of the mounts adjacent the electrodes and covers a segment of one or both of the lead wires at the point where they emerge from the mount presses. When the electrodes are devoid of emission material and the lamp has reached the end of its useful life, sputtered material from the metal parts of the mount renders the coating electrically conductive and causes the arc to impinge upon and puncture the mount. The coating accordingly serves as a "fail-safe" component.

Given the continuous objectives of reducing the number of parts in a fluorescent lamp, reducing the costs of such lamps, and reducing any threat to the environment presented in fluorescent lamps, it is deemed desirable to provide a relatively simple attachment for such lamps, which attachment operates to reduce leachable soluble mercury in the lamps, and in particular, to meet the EPA standards for a non-leachable lamp, and which provides for fail-safe termination at the end of lamp life.

SUMMARY OF THE INVENTION

It is, therefore, an object of the present invention to provide a fluorescent lamp having an attachment mounted therein which is operative to reduce a portion of soluble mercury in the lamp to elemental mercury, such that a remaining portion of soluble mercury leachable is less than 0.2 milligram per liter of the aqueous acid solution used in the TCLP.

A further object of the invention is to provide such a fluorescent lamp wherein the attachment is further operative to direct an electrical arc stream to impinge on the attachment, upon exhaustion of a cathode coating in the lamp, causing the mount within the attachment to crack, to provide for safe termination of the lamp.

With the above and other objects in view, as will hereinafter appear, a feature of the present invention is the provision of a fluorescent lamp having an attachment mounted therein for reduction of soluble mercury contained in the lamp, and to act as a fail-safe at the end of lamp life. The attachment comprises a collar of iron mesh providing an iron surface area sufficiently large to reduce a portion of the soluble mercury to elemental mercury when the lamp is pulverized to granules and subjected to a suitable aqueous acid solution, such that a remaining portion of soluble mercury leachable is less than 0.2 milligram per liter of the aqueous acid solution, whereby to provide a substantially non-soluble mercury leachable lamp.

In accordance with a further feature of the invention, the attachment is disposed around an electrode mount in the lamp and is electrically isolated from lead-in conductors, such that upon exhaustion of a cathode coating in the lamp, an electrical arc stream impinges on the attachment, causing the mount within the attachment to crack, whereby to provide for safe termination of operation of the lamp.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
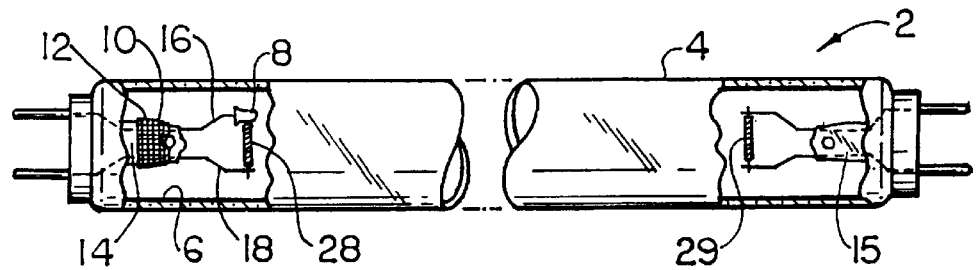
FIG. 1 is a side elevational view, interrupted and broken away, of one form of lamp illustrative of an embodiment of the invention.

Referring to FIG. 1, it will be seen that an illustrative fluorescent lamp 2 includes first and second electrodes 28, 29 extending, respectively, from first and second electrode mounts 14, 15 at opposite ends of an elongated envelope 4 of vitreous material, the interior surface of which is coated with a layer of phosphor 6. The envelope 4 further contains a quantity of an ionizable medium, typically mercury. The envelope 4 still further contains a starting gas, usually one or more of argon, neon, helium, krypton and xenon. The mercury may be disposed in a capsule 8 fixed, as by spot welding, to a lead-in conductor of one of the electrodes 28, 29 (shown on conductor 16 in FIG. 1). In U.S. Pat. Nos. 4,754,193 (Holmes) and No. 5,278,473 (Parks), the structure and operation of the mercury capsule 8 is shown and described.

Figure 2:
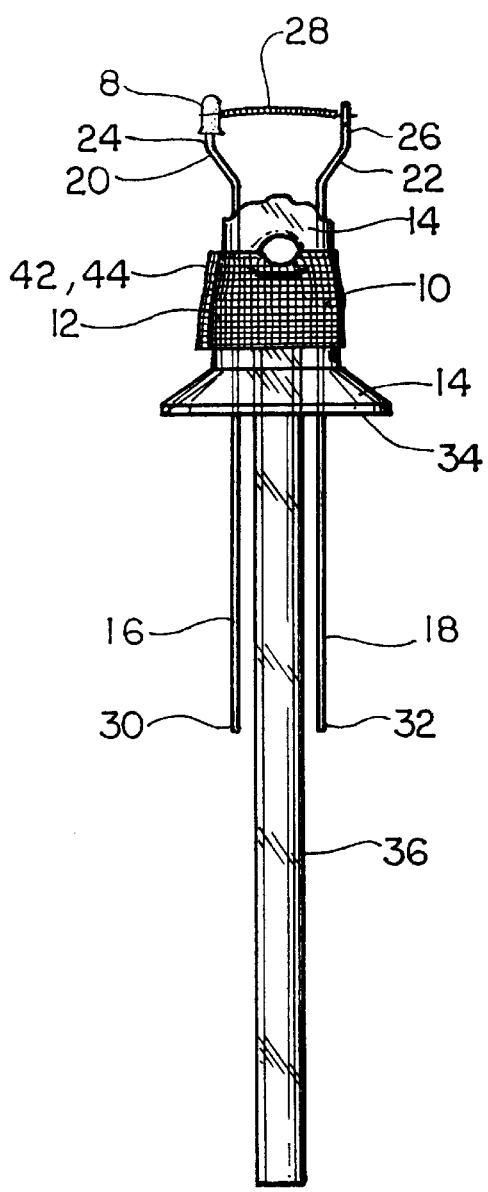
FIG. 2 is a front elevational view of one form of an attachment of FIG. 1, shown in combination with a mount member of FIG. 1.
Figure 3:
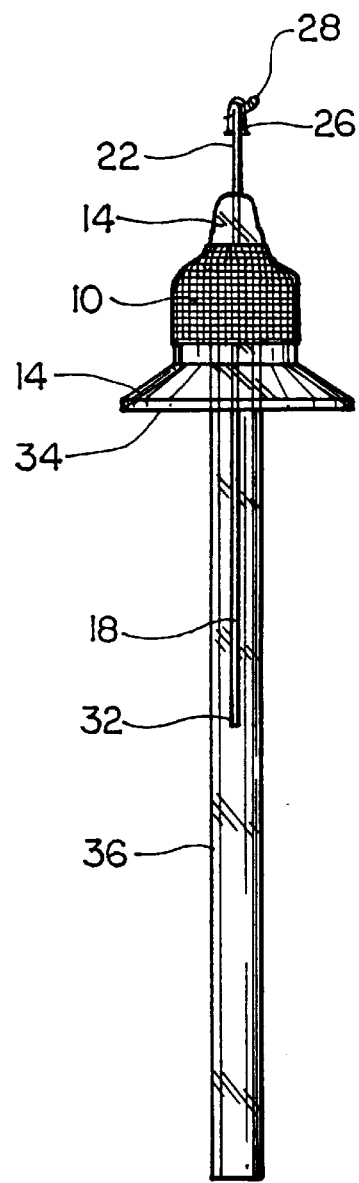
FIG. 3 is a side elevational view of the attachment and mount member of FIG. 2.

Referring to FIGS. 2 and 3, it will be seen that an illustrative lamp attachment 10 comprises a collar 12 of mesh material mounted on and around one of the glass electrode mounts 14, 15 of the fluorescent lamp 2 (shown on mount 14 in FIG. 1). The collar 12 is in contact with the glass mount 14 but spaced from lead-in conductors 16, 18 extending through the mount 14. The inner ends 20, 22 of the lead-in conductors 16, 18 form electrode supports 24, 26 for retaining an electrode 28. Outer ends 30, 32 of the lead-in conductors, in fabrication of a lamp, are cut off proximate, but spaced from, a glass mount outer end 34 for inclusion in external contacts of the lamp (not shown). In FIGS. 2 and 3, there is shown a fill tube 36 extending from the mount 14 and comprising an elongated hollow extension connected to the glass mount 14 so as to define an opening interconnecting the exterior and interior of the lamp. At the conclusion of production of the lamp, the fill tube 36 is melted off, fused and closed to hermetically seal the lamp, as is well known in the art.

The collar 12 is of a wire mesh construction and preferably is of iron (Fe). The mesh construction is such as to wrap completely around glass mount 14 (or glass mount 15) and provide sufficient Fe surface area to reduce a major portion of the soluble mercury in the lamp to elemental mercury when the lamp is pulverized to granules and subjected to a suitable aqueous acid solution, as required in the TCLP. A large enough portion of the soluble mercury is reduced so as to leave a leachable portion of soluble mercury to less than 0.2 milligrams per liter of the aqueous acid solution, so as to qualify the lamp as a "non-leachable" lamp under governmental standards.

Figure 4:
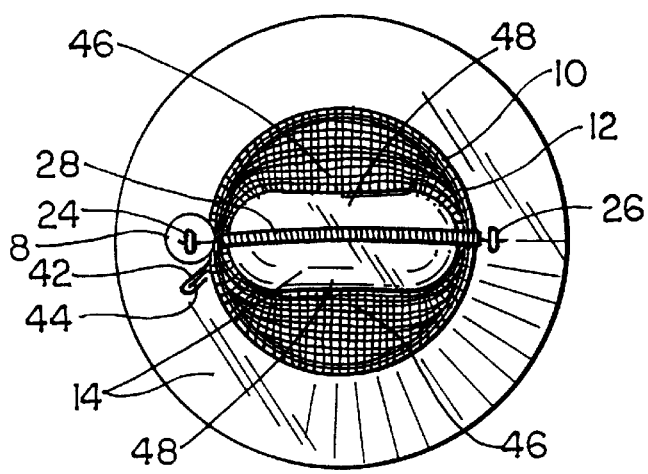
FIG. 4 is a top plan view of the attachment of FIG. 2.
Figure 5:
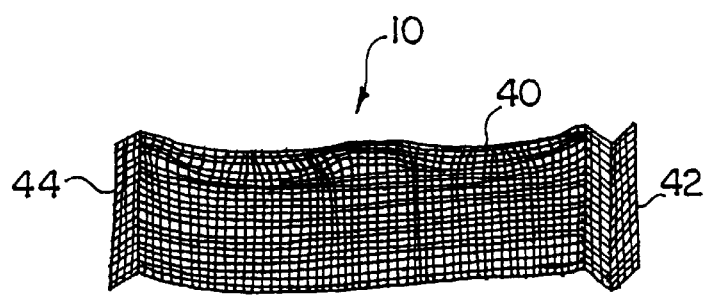
FIG. 5 is a perspective view of the attachment of FIGS. 1–4, shown before placement on the lamp mount member.

The collar 12 is formed from a generally rectangularly shaped member 40 (FIG. 5) having first and second ends 42, 44 adapted to be crimped together (FIG. 4) to form the collar 12 during attachment of the member/collar to the glass electrode mount 14. The member 40 is further provided with portions 46 crimped, or otherwise formed, so as to extend inwardly of the mount into recesses 48 in the mount 14 to hold the collar 12 on the mount in a stationary manner.

The mesh member may be constructed of wire mesh cloth of, for example, but not limited to, the range of 50×50 to 80×80 mesh and to the range of 5 to 9 mil wire diameter. The mesh member 40 preferably is of about 4 cm$^2$ area, or more, of iron mesh for a 4-foot T8 lamp. The wire surface area of such a mesh member is over three times the mesh area, i.e., more than 12 cm$^2$ in this case.

Figure 6:
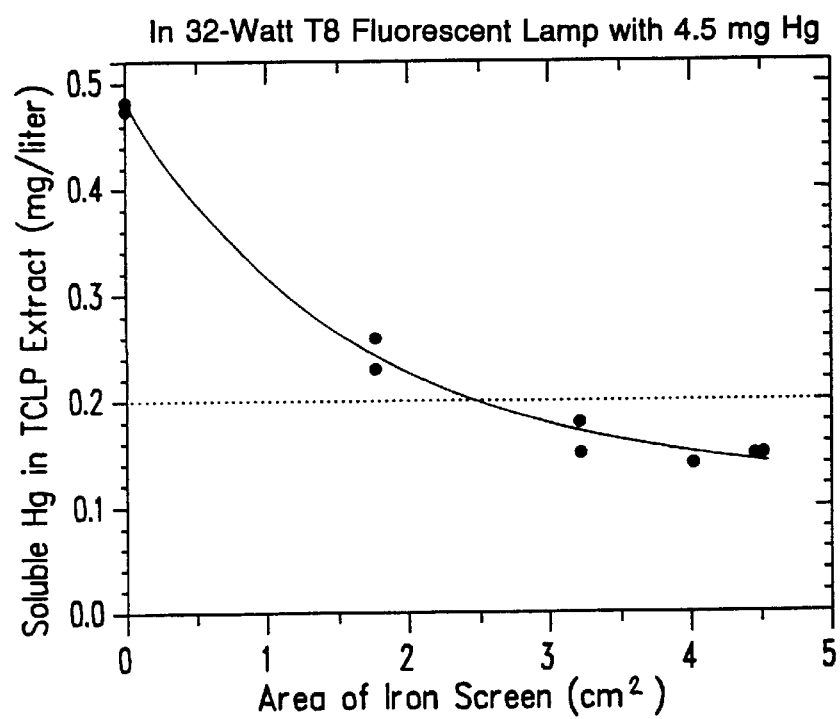
FIG. 6 is a graph illustrating surface area of the attachment of FIGS. 1–5 vs. TCLP test results.

Referring to FIG. 6, it will be seen that in a 32-watt U-bend T8 fluorescent lamp an area of 60×60 Fe mesh of less than about 3 cm$^2$ area is operative to reduce 4.5 mg of soluble mercury so as to produce a TCLP result of less than 0.2 mg/liter of the aqueous solution used in the TCLP.

Figure 7:
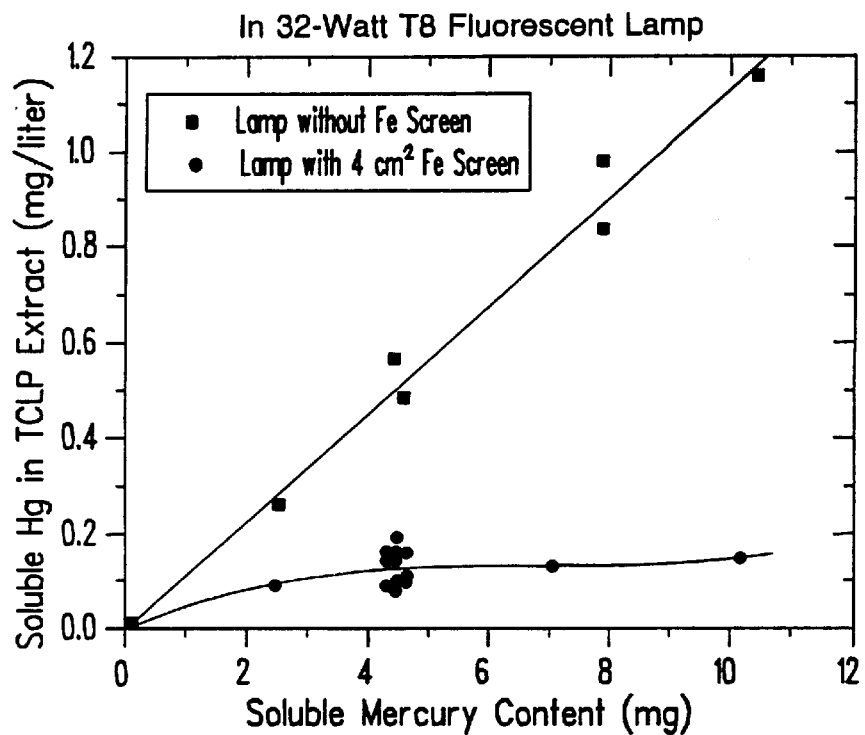
FIGS. 7 and 8 are graphs illustrating soluble mercury available in a lamp vs. TCLP test results.

In FIG. 7, it is shown that for the 32-watt linear T8 lamp wherein there is not disposed a soluble mercury reducing agent, the lamp will fail the TCLP if there is present in the lamp 2.5 mg or more of soluble mercury. However, when there is a 60×60 iron mesh of 4 cm$^2$ mesh area, disposed in the lamp, the lamp can contain up to 10 mg or more, of soluble mercury without exceeding the EPA limits of 0.2. Thus, if the lamp is charged with 10 mg of elemental mercury, and all of the elemental mercury is converted to soluble mercury, the lamp will qualify for "non-leachable" status.

Figure 8:
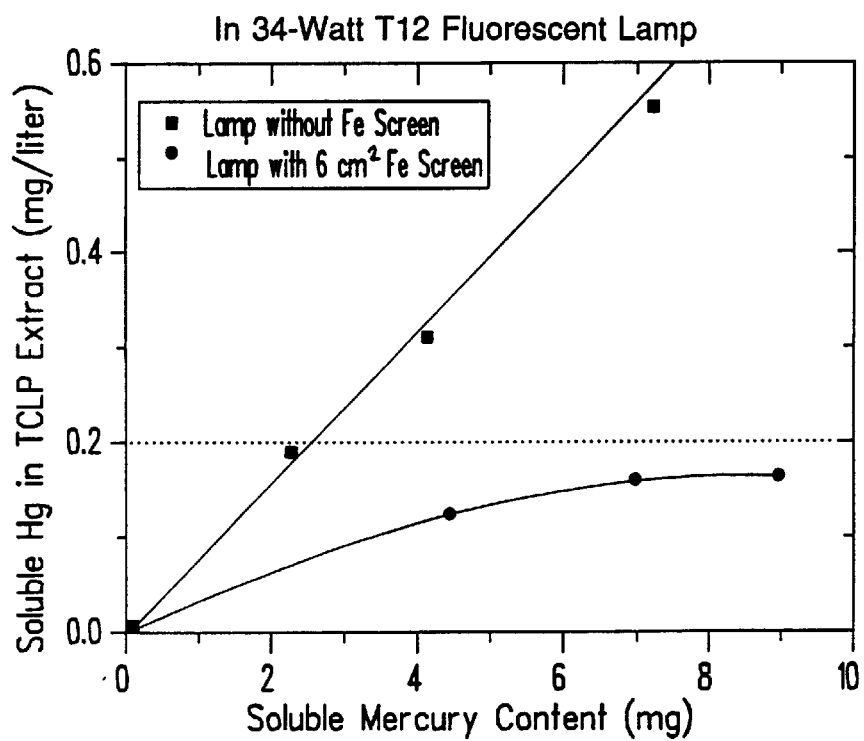

Similarly, FIG. 8 illustrates that in another given lamp (a 4-foot 34-Watt T12 lamp) having no soluble mercury reducing agent, TCLP values increase linearly with soluble mercury content within a 0–7.5 mg of soluble mercury range. With a 60×60 iron mesh of 6 cm$^2$ area present, or more than 18 cm$^2$ iron surface area, the lamp can be charged with more than 9 mg of mercury, all convertible to soluble mercury, without exceeding the EPA limit of 0.2 mg./liter of TCLP aqueous solution.

In addition to reducing the soluble mercury in the lamp to the "non-leachable" level required by the EPA, the Fe mesh attachment serves as a fail-safe at the end of lamp life. During normal lamp operation, the mesh collar 12 has no effect on lamp performance. However, when the cathode coating has been exhausted, the electrical arc stream impinges on the mesh, causing the glass mount 14 to crack, which is the preferred lamp failure mode at end of life.

Thus, there is provided a single attachment for fluorescent lamps which serves the dual functions of (1) reducing soluble mercury in the lamp when the lamp is pulverized, so as to render the lamp "non-leachable", and (2) terminating life of the lamp in a preferred manner.

It is to be understood that the present invention is by no means limited to the particular construction herein disclosed and/or shown in the drawings, but also comprises any modifications or equivalents within the scope of the claims.

Having thus described our invention, what we claim as new and desire to secure by letters patent of the United States is:

1. A fluorescent lamp having an attachment mounted therein for reduction of soluble mercury contained in the lamp and to act as a fail-safe at the end of lamp life, said attachment comprising a collar of iron mesh devoid of a mercury-amalgam material providing an iron surface area sufficiently large to reduce a portion of the soluble mercury to elemental mercury when the lamp is pulverized to granules and subjected to a suitable aqueous acid solution, such that a remaining portion of soluble mercury leachable is sufficiently small to render the lamp a substantially non-soluble mercury leachable lamp, said attachment being disposed around an electrode mount in the lamp and electrically isolated from electrode supporting lead-in contacts, such that upon exhaustion of a cathode coating in the lamp, an electrical arc stream impinges on said attachment, causing the mount within said attachment to crack, whereby to provide for safe termination of operation of the lamp.

2. The lamp in accordance with claim 1 wherein said sufficiently small portion of leachable soluble mercury is less than 0.2 milligram per liter of said aqueous acid solution.

3. The lamp in accordance with claim 1 wherein said collar is adapted for disposition completely around the electrode mount.

4. The lamp in accordance with claim 3 wherein said collar is provided with portions formed so as to extend inwardly of said mount, into recesses in said mount to hold said collar stationary on said mount.

5. The lamp in accordance with claim 3 wherein said collar, prior to being fixed on said electrode mount, comprises a generally rectangularly shaped member having first and second ends adapted to be crimped together to form said collar during attachment of said member to said electrode mount.

6. The lamp in accordance with claim 1 wherein said attachment: mesh comprises wires of about 5–9 mils in diameter and is of about 3–6 $cm^2$ in mesh area.

7. The lamp in accordance with claim 6 wherein said attachment iron surface area comprises about three times said mesh area.

8. The lamp in accordance with claim 6 wherein said attachment is of a mesh of about 50×50 to 80×80.

9. The lamp in accordance with claim 1 wherein said attachment iron surface area is directly related to the size of the lamp and the amount of soluble mercury in the lamp, such that the greater the size of the lamp and the greater the soluble mercury content of the lamp, the greater the iron surface area of said attachment.

10. The lamp in accordance with claim 9, wherein said lamp comprises a 32 watt T8 lamp having up to 10 mg soluble mercury, and said attachment comprises a 60×60 mesh with an area of about 4 $cm^2$ and an iron surface area of about 12 $cm^2$.

11. The lamp in accordance with claim 9, wherein said lamp comprises a 34 watt T12 lamp having up to 10 mg soluble mercury, and said attachment comprises a 60×60 mesh with an area of about 6 $cm^2$ and an iron surface area of about 16 $cm^2$.

12. A fluorescent lamp comprising:

an elongated envelope of vitreous material;

a first electrode extending from a first electrode mount fixed at a first end of said envelope;

a second electrode extending from a second electrode mount fixed at a second end of said envelope;

a body of soluble mercury disposed in said envelope; and an attachment mounted on said first electrode mount and electrically isolated from said first electrode, said attachment comprising a collar of iron mesh devoid of a mercury-amalgam material providing an iron surface area sufficiently large to reduce a portion of the soluble mercury to elemental mercury when the lamp is pulverized to granules and subjected to a suitable aqueous acid solution, such that a remaining portion of soluble mercury leachable is sufficiently small to render the lamp a substantially non-soluble mercury leachable lamp, said attachment being so disposed that upon exhaustion of a cathode coating in the lamp, an electrical arc stream impinges on said attachment, causing said first electrode mount to crack whereby to provide for safe termination of operation of the lamp.

13. The lamp in accordance with claim 12 wherein said sufficiently small portion of leachable soluble mercury is less than 0.2 milligrams per liter of said aqueous acid solution.

14. The lamp in accordance with claim 13 wherein said collar is provided with portions formed so as to extend inwardly of said first electrode mount, into recesses in said first electrode mount to hold said collar stationary on said mount.

15. The lamp in accordance with claim 12 wherein said attachment mesh comprises wires of about 5–9 mils in diameter and is of about 3–6 $cm^2$ in mesh area.

16. The lamp in accordance with claim 15 wherein said attachment: iron surface area comprises about three times said mesh area.

17. The lamp in accordance with claim 15 wherein said attachment is of a mesh of about 50×50 to 80×80.

18. The lamp in accordance with claim 12 wherein said attachment iron surface area is directly related to the size of the lamp and the amount of soluble mercury in the lamp, such that the greater the size of the lamp and the greater the soluble mercury content of the lamp, the greater the iron surface area of said attachment.

19. The lamp in accordance with claim 18, wherein said lamp comprises a 32 watt T8 lamp having up to 10 mg soluble mercury, and said attachment comprises a 60×60 mesh with an area of about 4 $cm^2$ and an iron surface area of about 12 $cm^2$.

20. The lamp in accordance with claim 18, wherein said lamp comprises a 34 watt T12 lamp having up to 10 mg soluble mercury, and said attachment comprises a 60×60 mesh with an area of about 6 $cm^2$ and an iron surface area of about 16 $cm^2$.

* * * * *